(No Model.)  3 Sheets—Sheet 1

F. H. MERRILL.
WATER RAISING APPARATUS.

No. 561,268.  Patented June 2, 1896.

Witnesses
Geo. Wadman
M. Wilson

Inventor
Frank H. Merrill
by Gifford & Bull
Attys

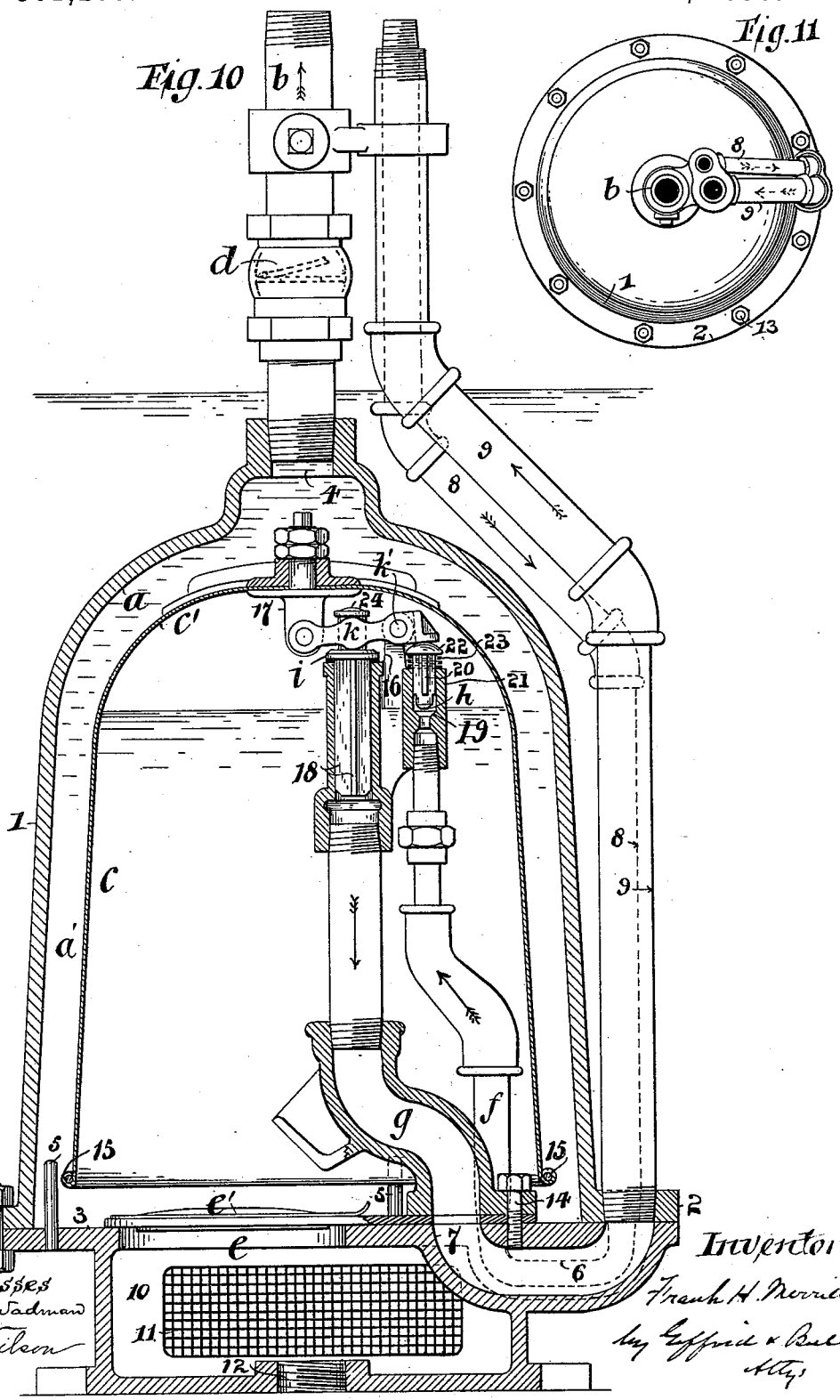

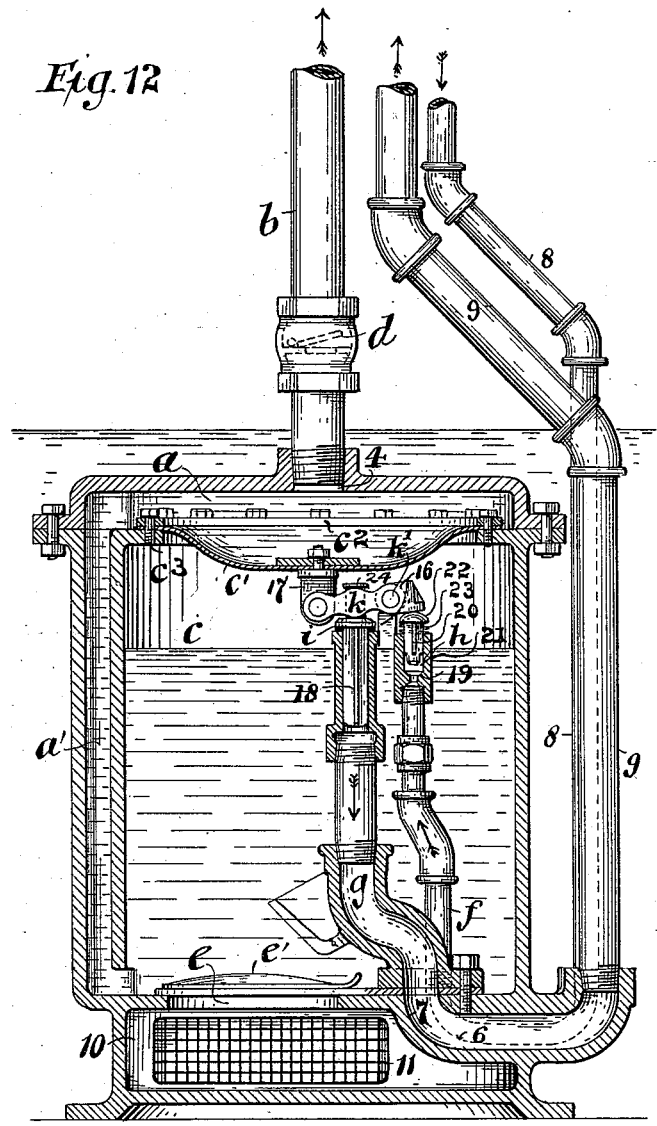

UNITED STATES PATENT OFFICE.

FRANK H. MERRILL, OF BOUND BROOK, NEW JERSEY, ASSIGNOR TO THE MERRILL MANUFACTURING COMPANY, OF NEW JERSEY.

WATER-RAISING APPARATUS.

SPECIFICATION forming part of Letters Patent No. 561,268, dated June 2, 1896.

Application filed August 24, 1894. Serial No. 521,201. (No model.)

*To all whom it may concern:*

Be it known that I, FRANK H. MERRILL, a citizen of the United States, and a resident of Bound Brook, in the county of Somerset and State of New Jersey, have invented certain new and useful Improvements in Water-Raising Apparatus, of which the following is a specification.

The apparatus which I am about to describe is especially designed for pumping water by compressed air.

Figures 1, 2, 3, 4, 5, 6, 7, 8, and 9 are diagrams to illustrate the principles of the invention. Fig. 10 is a vertical section of the apparatus as constructed for use. Fig. 11 is a plan view of the same on a smaller scale than Fig. 10. Fig. 12 is a vertical section of a modification.

My invention includes a new principle, which may be embodied in various forms of mechanism. It also includes the mechanism in which I have succeeded in making use of that principle.

The principle of my pump may be explained by reference to the diagrams.

Figure 1:
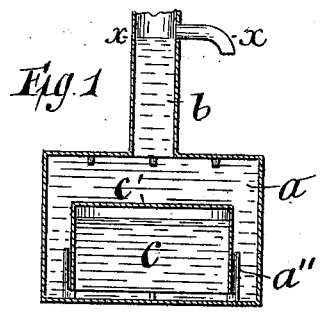
Figure 2:
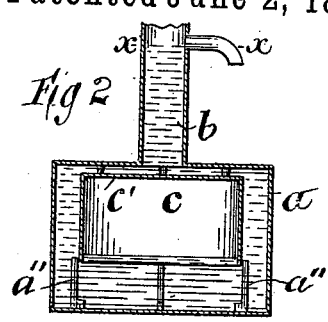

Suppose in the diagram Figs. 1 and 2 the compartment $a$ and stand-pipe $b$ to be under pressure of a contained column of water extending up to the line $x\ x$. The interior inverted vessel $c$ is constructed of material heavier than the water. If there be no air under the vessel $c$, it will lie at the bottom of the compartment $a$, as shown in Fig. 1. If there be a sufficient quantity of air under the vessel $c$, it will rise to the top of the compartment $a$, as shown in Fig. 2, being guided by the pins $a''$. Whether the vessel $c$ be in the position of Fig. 1 or in the position of Fig. 2 the conditions existing in the water of the stand-pipe $b$ and of the compartment $a$ outside of the vessel $c$ will remain the same. The same principle is involved if instead of making the vessel $c$ bodily movable a part of it only is movable. Thus in Figs. 3 and 4 the vessel $c$ is supposed to be fixed, but to be provided with a section $c'$, which is movable and secured to the sides of $c$ by an air-tight flexible connection $c^2$. In this case, if there be no air under the vessel $c$, the section $c'$, being of material heavier than water, will be depressed, as in Fig. 3; but if there be a sufficient quantity of air under the vessel $c$ the section $c'$ will be raised, as in Fig. 4. In both forms (Figs. 1 and 2 as well as Figs. 3 and 4) the body of air in the vessel $c$ is held between water above and water below and is separated from the water above by a movable partition. In Figs. 1 and 2 the top of the vessel $c'$ may be considered as this partition, being rigidly secured to the sides, because the whole moves, and in Figs. 3 and 4 the part $c'$ may be considered as this partition, being movably connected with respect to the sides, because the sides are fixed.

Figure 3:
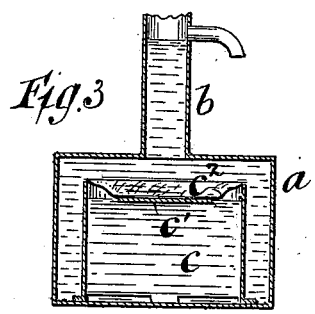
Figure 4:
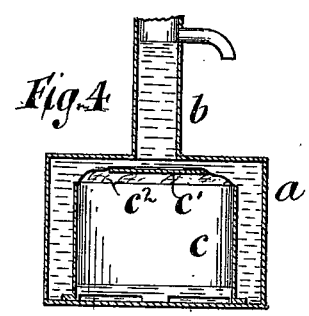

Now I have discovered that I can utilize the tendency of the partition $c'$ to move from the position of Fig. 1 to the position of Fig. 2, or from the position of Fig. 3 to the position of Fig. 4, and vice versa, for opening and closing pressure and exhaust-air passages connected with the space underneath it, and thereby produce a pumping operation under a substantially constant column of water in the stand-pipe $b$. The means by which I do this will be understood by referring to Figs. 5 and 6, where it will be seen that I have added a check-valve $d$ in the stand-pipe $b$; also, a valved opening $e$ in the bottom of the compartment $a$; also, an air-pressure pipe $f$, opening into the space beneath the vessel $c$; also, an air-exhaust pipe $g$, leading from the space beneath the vessel $c$; also, a valve $h$, controlled by the motions of the vessel $c$ and controlling the exit-opening from the pipe $f$; also, a valve $i$, controlled by the motions of the vessel $c$ and controlling the entrance-opening into the pipe $g$. The valves $h$ and $i$ are so fixed relatively to each other that when one is closed the other is opened—that is to say, the valve $h$ will be opened and the valve $i$ closed when the vessel $c$ is at the bottom of its stroke owing to the absence of air under it, and, conversely, the valve $h$ will be closed and the valve $i$ opened when the vessel $c$ is at the top of its stroke owing to the presence of air under it. Omitting for the present the consideration of the momentum of water and the differential pressures upon the valves, when the specific gravity of the vessel $c$ and its contents (owing to the absence of air under it) is greater than water it will occupy the position shown in Fig. 5; but when the specific gravity of the vessel c and its contents (owing to the presence of air under it) is less than the water it will occupy the position shown in Fig. 6.

Figure 5:
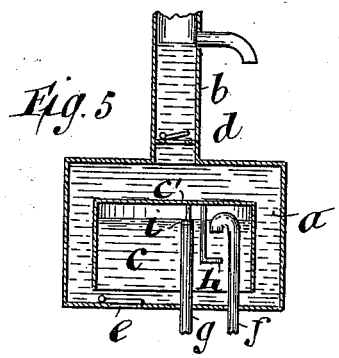

In the position shown in Fig. 5 the pressure of the air entering underneath the vessel c from the pipe f will close the valve e, open the valve d, and force water upward through the stand or delivery pipe b.

Figure 6:
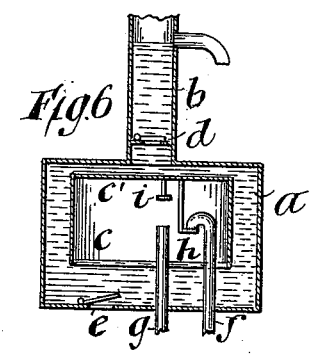

In the position shown in Fig. 6 the valve e opens and the valve d closes, and the water in which the compartment a is immersed enters through the valve-opening e and occupies the space beneath the vessel c to the exclusion of the air which escapes through the pipe g.

Figure 7:
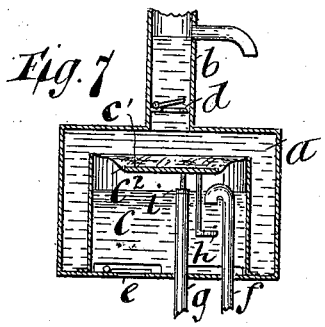
Figure 8:
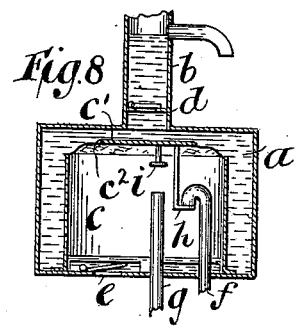

Figs. 7 and 8 show a corresponding mode of operation, where the construction is like Figs. 3 and 4.

If the forces so far considered were the only ones at work, the transitions from the condition shown in Fig. 5 to the condition shown in Fig. 6, or from Fig. 7 to Fig. 8, and vice versa, might succeed each other so rapidly as to discharge very little water from underneath the vessel c at each stroke; but I have discovered that there are other forces available by which such transitions may be delayed to the extent, if desired, of discharging substantially the water contents of the vessel c at each stroke. These forces and the manner in which they act can be best described in connection with Figs. 5, 6, 7, 8, 10, and 12.

When the parts are in the position shown in Figs. 5 and 7, I will suppose that the column of water in the stand-pipe b is sufficient to produce a pressure of fifty pounds to the square inch in the vessel a. This pressure will be equal on the inside and outside of the partition c'. If the valve i be one inch in area, there will be a pressure, tending to hold that valve shut, of fifty pounds. Now the valve i will not open until the buoyancy of the vessel c, due to the displacement of water from it, is greater than fifty, or, in other words, until (omitting, roughly, the weight of the vessel c and the weight of the air displacing the water) the weight of the water displaced is greater than fifty pounds. Obviously, therefore, for a given column of water in the stand-pipe b the amount of water which may be driven out of the vessel c before the valve i opens will depend upon the size of the valve i, and by suitably regulating the size of the valve i the constructor of the pump can build the apparatus so that for a given column of water in the stand-pipe b the vessel c will be substantially emptied of water on each operation before the valve i opens. As soon as the valve i commences to open and the air commences to find its way between that valve and its seat it, pressing upward, will tend to counterbalance the downward pressure upon the valve i, so that there is less downward pressure to oppose the buoyancy beneath the partition c' than when the valve i was closed. Consequently as soon as the valve commences to open the buoyancy beneath the partition c' will assert itself quickly and carry the vessel c upward as far as will be permitted by the closing of the valve h, as shown in Fig. 6. The next object is to maintain the vessel c in the position shown in Figs. 6 and 8 long enough to permit the vessel c to be largely filled with water—as, for instance, up to the level of the top of the pipe g. One feature contributing to this result is the largeness of the water-entrance-valve opening e, which admits the water so rapidly as to require a very short intermission between the operations of the pump.

Suppose the air-pressure in the pipe f to be fifty pounds (which will in practice run up somewhat higher than this while the valve h is closed) and the cross-area of the opening closed by the valve h to be one-fiftieth of a square inch, then (omitting the weight of the vessel c and air contained in it) the downward pressure on the valve h will not overcome the buoyancy beneath the partition c' until the water has risen in the vessel c to a level where only a small amount of water additional would be required to fill it. Thus, roughly speaking, for a given pressure of air in the pipe f it is entirely within the power of the operator to determine how full of water the vessel c shall be at each stroke by regulating the size of the air-passage at the valve h. Thus for a given air-pressure in the pipe f and a corresponding column of water in the stand-pipe b the distance between the levels of water in the vessel c at which, respectively, it rises and falls will be determined by the difference between the area of the valve i and the area of the induction-opening controlled by the valve h.

The momentum of the water as it enters the valved opening e will be such that when it is checked by the closing of the valve i it will serve to compress the air still remaining in the top of the vessel c and economize in compressed air.

Figure 9:
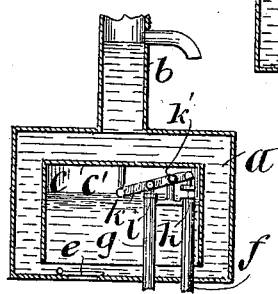

To avoid the necessity of a large difference between the area of the passage controlled by the valve h and of the valve i, I prefer to introduce a leverage, Figs. 9, 10, and 12, to secure a difference in the power delivered to those valves, respectively, by the movement of the partition c'. Thus in Fig. 9, instead of having the valves fixed to the partition c', I secure to the partition c' one arm of a lever k, having a fixed fulcrum k'. The long arm of this lever is secured to the partition c' and carries the valve i. The short arm carries the valve h at a shorter distance from the fulcrum than is the valve i. Thus each pound of force exerted by the vessel c may be mutiplied, say, twice for the valve i and four times for the valve h.

In all of the constructions referred to, including Fig. 12, as well as the others, the air-compartment constitutes, in substance, a hood placed over the top of the air induction and eduction passages within the water-compartment, so that the pressure of the water has access beneath as well as adjacent to the top of the hood, a wall of the hood being movable and controlled by the greater or less buoyancy of the greater or less volume of air in the hood.

In the apparatus constructed as shown in Figs. 10 and 11, as I prefer for practical use, the water-compartment $a$ is cast in two pieces, consisting of the body portion 1, provided with the bottom flange 2, and of the base-plate 3. The body portion 1 is provided at the top with a screw-threaded hole 4, into which is screwed the water-delivery pipe $b$. The base-plate 3 carries on its top the pipes $f$ and $g$, the valve $e'$, and the guide-pin 5, whereby the vessel $c$ is guided in its movements. On its bottom the base-plate 3 is provided with the air-passages 6 (in dotted lines, Figs. 10 and 12) and 7, (in full lines, Figs. 10 and 12,) connecting the pipes $f$ and $g$, respectively, with the pressure and exhaust-air pipes 8 and 9, respectively. The base-plate 3 is also provided on its bottom with a chamber 10, into which water from the outside has to enter through the strainer 11 before passing into the opening $e$. This chamber also forms a rest or standard for the whole apparatus and may be secured to a stud screw-threaded to the hole 12. The walls of the chamber 10 and of the passages 6 and 7 may be cast in one piece with the base-plate 3. The base-plate 3 may be connected with the flange 2 by the bolts 13 and with the pipe $g$ by the bolt 14.

The vessel $c$ may consist of sheet-copper, quite thin, because the water-pressure upon it being substantially equal inside and out there is very little, if any, force tending to collapse it. It is stiffened around its lower edge by the wire or rod 15. Since the pipes $f$ and $g$ are stationary, they may be made to bear the piece 16, upon which the fulcrum $k'$ is mounted. The stud 17, to which the long arm of the lever $k$ is pivoted, may be secured to the vessel $c$ in any suitable manner. The valve $i$ is centered within the mouth of the pipe $g$ by the projection 18. The valve $h$ is centered above its seat 19 by the projection 20, within the extension 21, from the pipe $f$. The projection 20 is provided with a head 22, upon which bears the short arms of the lever $k$ and between which and the top of the extension 21 is preferably interposed a spiral spring 23, tending slightly to hold the valve $h$ open. A circular enlargement on the lever $k$ is placed between the top of the valve $i$ and an overhanging flange 24 secured thereto, so that the valve $i$ is compelled to respond to all the motions of the lever $k$.

In the modification shown in Fig. 12 the vessel $c$ constitutes a division in the compartment $a$, the sides of which are cast in one piece with the sides of compartment $a$, and the interior of which, below the partition $c'$, is connected with the space above the partition $c'$ by the passage $a'$. The castings of the parts may be made and put together as indicated in the drawings. The partition $c'$ may consist of any suitable material flexible or flexibly connected with the adjacent walls of the vessel $c$ and held in place between a ring $c^2$ and edges or flanges $c^3$ of the walls.

Having thus described the principle of my invention and the apparatus in which I prefer to embody such principle for use, I do not desire to be understood as limiting myself to the form of said apparatus or to the location of the parts.

I claim—

1. In combination, a liquid-compartment, a liquid-delivery passage therefrom, a check-valve, a gas-compartment, a liquid-entrance passage thereto, a valve controlling said liquid-entrance passage, a liquid-exit passage from said gas-compartment into said liquid-compartment, a movable partition separating said gas-compartment from said liquid-compartment, a gas-induction passage leading into said gas-compartment, a gas-eduction passage leading from said gas-compartment, valves controlling said gas-passages and mechanism whereby said valves are moved by the movement of said partition due to the variations of buoyancy of the contents of the gas-compartment, substantially as described.

2. In combination, a liquid-compartment, a liquid-delivery pipe therefrom, a check-valve, a gas-compartment wherein the body of air is subjected to the pressure of the liquid in the liquid-compartment both above and below, the liquid-entrance passage into said gas-compartment, a valve controlling said liquid-entrance passage, a movable partition separating the body of air from the liquid above the same, a gas-induction passage leading into said gas-compartment, a gas-eduction passage leading from said gas-compartment, valves controlling said gas-passages and mechanism whereby said valves are moved by the movement of said partition due to the variations of buoyancy of the contents of said gas-compartment, substantially as described.

3. In combination, a liquid-compartment, a liquid-delivery passage therefrom, a check-valve, a gas-compartment, a liquid-entrance passage thereto, a valve controlling said liquid-entrance passage, a liquid-exit passage from said gas-compartment into said liquid-compartment, a movable partition separating said gas-compartment from said liquid-compartment, a gas-induction passage leading into said gas-compartment, a gas-eduction passage leading from said gas-compartment, valves controlling said gas-passages and mechanism whereby said valves are moved by the movement of said partition due to the variations of buoyancy of the contents of the gas-compartment; the surface of the eduction-valve exposed to pressure within gas-compartment being greater than the surface of the induction-valve exposed to pressure within said induction-pipe, substantially as described.

4. In combination, a liquid-compartment, a liquid-delivery passage therefrom, a check-valve, a gas-compartment, a liquid-entrance passage thereto, a valve controlling said liquid-entrance passage, a liquid-exit passage from said gas-compartment into said liquid-compartment, a movable partition separating said gas-compartment from said liquid-compartment, a gas-induction passage leading into said gas-compartment, a gas-eduction passage leading from said gas-compartment, valves controlling said gas-passages and mechanism whereby said valves are moved by the movement of said partition due to the variations of buoyancy of the contents of the gas-compartment, and lever mechanism connecting said induction and eduction valves with said partition whereby a differential power may be communicated to said valves, substantially as described.

5. In combination, a liquid-compartment, a liquid-delivery passage therefrom, a check-valve, a gas-compartment consisting of a vessel open at the bottom contained within said liquid-compartment, a liquid-entrance passage, a valve controlling said liquid-entrance passage, a gas-induction passage leading into said gas-compartment, a gas-eduction passage leading out of said gas-compartment, valves controlling said gas-passages and means whereby said valves are moved by the movement of said gas-compartment due to the variations in buoyancy of the contents thereof, substantially as described.

6. As a means for moving the gas induction and eduction valves of a pneumatic pump, the following parts in combination with the liquid-compartment, viz: a hood covering the induction and eduction openings of the gas-passages containing a movable wall separating space beneath said hood from the remainder of the liquid-compartment, mechanism whereby said movable wall is connected with said valves whereby said valves are controlled by the buoyancy of the air under said hood, substantially as described.

7. In combination a liquid-compartment, a movable partition partitioning off a gas-space therein a liquid-delivery passage, a check-valve therein, induction and eduction passages connected with said gas-space and otherwise cut off from the liquid-compartment, valve mechanism controlling said passages and mechanism connecting said movable partition with said valve mechanism whereby the latter is moved by the movement of the partition due to the variations of air contained within the air-space, substantially as described.

8. As a means for controlling the gas induction and eduction passages of a pump, the following parts in combination with the liquid-compartment, viz: a movable partition partitioning off a gas-space in said liquid-compartment, connection between the said induction and eduction air-passages and the said gas-space, which connection substantially cuts off said induction and eduction passages from said liquid-compartment otherwise than through said air-space, valve mechanism controlling said passages and mechanism connecting said movable partition with said valve mechanism whereby the latter is moved by the movement of the partition due to the variations of air contained within the air-space, substantially as described.

9. As a means for moving the gas induction and eduction valve mechanism of a pneumatic pump, in combination with a liquid-compartment, a vessel open at the bottom, mechanism whereby said vessel is connected with said valve mechanism to move the latter as the buoyancy within said vessel changes, and means whereby the air from said induction and eduction passages is conveyed to and from the space under said vessel, substantially as described.

10. In a pneumatic pump, in combination, an exterior liquid-compartment, an interior movable vessel, induction and eduction liquid-passages connected with the liquid-compartment outside of the interior vessel, induction and eduction gas-passages connected with said liquid-compartment inside of said movable vessel, valve mechanism controlling the induction and eduction passages and a connection between said valve mechanism and said interior vessel; said interior vessel being provided with an opening from its interior out into the liquid-compartment, substantially as described.

Signed at Bound Brook, in the county of Somerset and State of New Jersey, this 18th day of August, A. D. 1894.

FRANK H. MERRILL.

Witnesses:
H. C. SUYDAM,
E. S. STRICKLAND.